Figure 1:
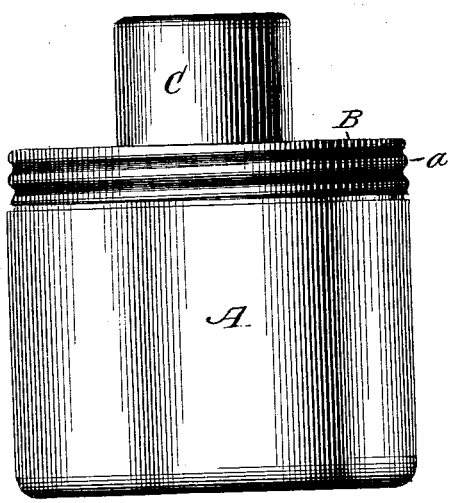

No. 703,024.  
M. J. WADE.  
PASTE POT OR JAR.  
(Application filed Apr. 5, 1902.)  
Patented June 24, 1902.

(No Model.)

Witnesses  
C. J. Williamson  
M. E. Moore

Inventor  
Martin J. Wade  
per Chas. H. C. Fowler  
Attorney

UNITED STATES PATENT OFFICE.

MARTIN J. WADE, OF IOWA CITY, IOWA.

PASTE POT OR JAR.

SPECIFICATION forming part of Letters Patent No. 703,024, dated June 24, 1902.

Application filed April 5, 1902. Serial No. 101,482. (No model.)

*To all whom it may concern:*

Be it known that I, MARTIN J. WADE, a citizen of the United States, residing at Iowa City, in the county of Johnson and State of Iowa, have invented certain new and useful Improvements in Paste Pots or Jars; and I do hereby declare that the following is a full, clear, and exact description of the same, reference being had to the annexed drawings, making a part of this specification, and to the letters of reference marked thereon.

The present invention has relation to that class of paste pots or jars in which is employed an outer vessel or receptacle for containing water and an inner vessel or paste-holder located therein and surrounded by the water, whereby the paste in the holder will be prevented from hardening or caking through the medium of the moisture caused by evaporation, which is brought in contact with the paste and prevents the same from hardening and caking and retains it in the proper condition for use.

The invention consists in a paste pot or jar constructed substantially as shown in the drawings and hereinafter described and claimed.

Figure 2:
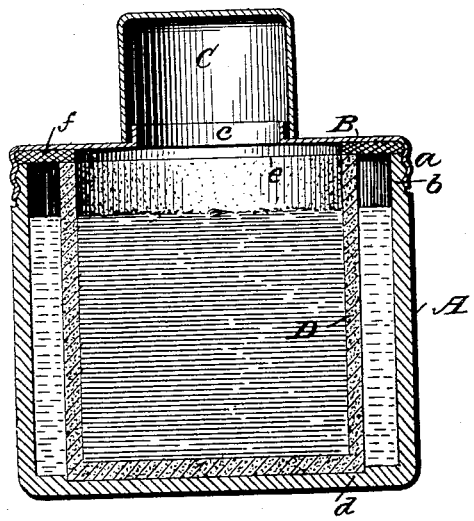

Figure 1 of the drawings is a side elevation of a paste pot or jar embodying my invention; Fig. 2, a sectional elevation thereof.

In the accompanying drawings, A represents the outer vessel or receptacle of the paste pot or jar, and B the cover thereof, which is provided with the downwardly-extending screw-flange $a$, adapted to engage a screw-flange $b$ at the top of the vessel or receptacle. This outer vessel or receptable A is for the purpose of containing water and may be constructed of glass, earthenware, metal, or any other suitable material found best adapted to the purpose and may be of any size and shape considered preferable, and the cover B is preferably of metal, but may be constructed of any other material found most desirable.

The cover B has a central opening for the paste-brush, and said opening is surrounded by an upwardly-extending flange $c$ to form a guide for a central cap C to close the opening in the cover when the paste pot or jar is not in use, and also the cap is held in position over the opening by the upwardly-extending flange, as shown in Fig. 2 of the drawings.

The paste-holder D is constructed of a porous material, such as clay or any material or substance that will allow a free percolation therethrough of the water or moisture, said holder being centered in the vessel or receptacle A by means of the depression $d$ in the bottom thereof, or any other means may be employed to retain the holder in its proper position with relation to the vessel or receptacle. The paste-holder D being formed of a porous material, such as clay, enables the water and moisture to percolate through the side wall thereof and come in contact with the paste uniformly throughout its bulk, thereby retaining the paste in a moist condition and uniform consistency. The paste-holder D is of a height uniform with the interior height of the receptacle A, so that the upper edge $e$ of the wall of the paste-holder will be on a line and flush with the edge of the screw-flange $b$. The edge of the screw-flange $b$ and the edge $e$ coming on line with each other enables the packing $f$ to rest thereon and close all communication between the water-space of the outer vessel or receptacle and the opening at the top of the paste-holder, causing the water and moisture to pass through the pores of the wall of the paste-holder into the interior and through the paste from top to bottom thereof. The packing $f$ is held down tightly against the edge $e$ and the edge of the screw-flange $b$ by means of the cover B, so that there is no possibility of the water spilling into the paste-holder should the paste pot or jar become accidentally overturned.

Having now fully described my invention, what I claim as new, and desire to secure by Letters Patent, is—

A paste pot or jar comprising an outer vessel or receptacle for containing the water and an inner vessel or holder for the paste composed of a porous material, the upper edges of both the outer vessel or receptacle and the inner vessel or paste-holder being flush and on line with each other, a packing resting on the edges and closing communication between the water-space of the outer vessel or receptacle and the interior of the vessel or paste-holder, a cover to hold the packing in place and having a central opening with upwardly-extending flange, and a cap to close the opening in the cover, substantially as and for the purpose described.

In testimony that I claim the above I have hereunto subscribed my name in the presence of two witnesses.

MARTIN J. WADE.

Witnesses:
W. J. WEEBER,
J. SWITZER.